Figure 1:
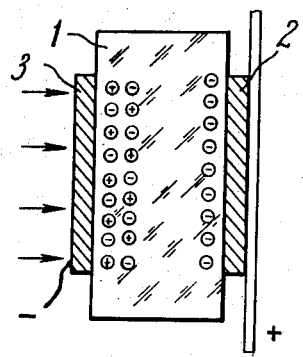

United States Patent [19]
Kozlov et al.

[11] 3,824,680
[45] July 23, 1974

[54] NUCLEAR RADIATION DETECTOR AND METHOD OF MANUFACTURING SAME

[75] Inventors: Stanislav Fedorovich Kozlov; Elena Laexandrovna Konorova, both of Moscow, U.S.S.R.

[73] Assignee: Ordena Levina Fizichesky Institut Imeni P. N. Lebedeva, Leninsky Prospekt, Moscow, U.S.S.R.

[22] Filed: July 8, 1971

[21] Appl. No.: 160,917

Related U.S. Application Data
[62] Division of Ser. No. 716,953, March 28, 1968, Pat. No. 3,665,193.

[52] U.S. Cl.............................. 29/592, 250/83.3 R
[51] Int. Cl................................................. G01t 1/24
[58] Field of Search........ 29/592, 571; 317/235 AP; 250/83.3 R, 83 R

[56] References Cited
UNITED STATES PATENTS
| | | | |
|---|---|---|---|
| 2,760,078 | 8/1956 | Youmans........................ | 250/83.3 R |
| 3,387,358 | 6/1968 | Heiman............................... | 29/571 |
| 3,529,161 | 9/1970 | Oosthoek et al............... | 250/83.3 R |

FOREIGN PATENTS OR APPLICATIONS
1,179,303    10/1964    Germany........................... 317/235

OTHER PUBLICATIONS
Electronic Properties of Diamonds, Champion, 1963, pp 36 and 91 (copy in Scientific Library TS 753 C45)

Primary Examiner—Charles W. Lanham
Assistant Examiner—James W. Davie
Attorney, Agent, or Firm—Waters, Roditi & Schwartz

[57] ABSTRACT

A method of manufacturing a nuclear radiation detector comprising forming a plate from a diamond crystal whose thickness does not exceed the distance travelled by charge carriers within the plate under the influence of an applied field. The plate is then annealed in a vacuum at a temperature of 1,000° to 1,300°C whereafter blocking and injecting contacts are formed on opposite sides of the plate. During operation of the detector, polarization within the plate is removed by injection of charge carriers into the plate via the injecting contact, the latter being formed on the side of the plate opposite to that which is subjected to the radiation to be detected.

11 Claims, 2 Drawing Figures

PATENTED JUL 23 1974　　　　　　　　　　　　　　　3,824,680

NUCLEAR RADIATION DETECTOR AND METHOD OF MANUFACTURING SAME

CROSS RELATED APPLICATION

This application is a division of Ser. No. 716,953 filed Mar. 28, 1968, and issued as U.S. Pat. No. 3,665,193 on May 23, 1972.

The present invention relates to methods of manufacturing nuclear radiation detectors.

There are known nuclear radiation detectors consisting of a crystal of natural diamond with a lower nitrogen content (the nitrogen concentration is usually less than $10^{19}$ atoms $cm^{-3}$) provided with electric contacts. When applying a potential difference across the diamond and irradiating it with nuclear particles from any side, current pulses are induced inside the crystal. These current pulses produce, in an external circuit, voltage pulses which are amplified and counted by appropriate apparatus.

This behavior is shown only by a small number of diamond crystals and the counting properties of such detectors are diverse and uncontrollable. Such detectors have poor counting efficiency and low energy resolving power, and operate with incomplete collection of the charge carriers created in the crystal by incident nuclear particles. In addition, electric polarization occurs in these crystals, since the resistivity of said crystals is high. As a result, their counting properties deteriorate under irradiation. Known methods of removing polarization by heating or illumination with light of appropriate wavelengths are inconvenient and ineffective. For these reasons, the detectors based on diamond crystals have not found wide practical application.

It is an object of the present invention to provide a method for manufacturing a diamond detector which can operate at room and higher temperatures and possess good counting efficiency, complete charge collection and high energy resolution, as well as constancy of its properties under prolonged irradiation, said detector being made from a high resistivity diamond crystal and, hence, operating without increasing noise level.

In the accomplishment of the above and other objects of the invention, in a detector consisting of a diamond crystal plate with two electric contacts located at its opposite sides across which plate a potential difference is applied, according to the invention, the thickness of the operating range of the plate between the contacts is kept at or below the distance traveled under the influence of the applied electric field by the charge carriers created by nuclear radiation in the diamond crystal. The contact through which the incident nuclear particles penetrate into the crystal is made blocking in relation to the charge carriers, while the opposite contact is made from a material capable, in conjunction with diamond, of injecting the charge carriers into the crystal under the influence of the electric field.

If the detector is made from diamond in which the distance traveled by electrons is longer than that traveled by holes, the contact on the unirradiated side of the plate should inject holes and the positive potential is applied to this contact. If the detector is made from diamond in which the distance traveled by electrons is less than that traveled by holes, the contact on the unirradiated side of the plate should inject electrons and the negative potential is applied to this contact.

When the condition of complete charge collection is observed and provided that the thickness of the diamond crystal plate is low, a recess is made in the thick plate of the crystal with a view to increasing the mechanical strength of the detector the thickness of the bottom of said recess being equal to the distance traveled by the charge carriers.

As experiments have shown, silver, gold, platinum and graphite may be used as a material insuring, in conjunction with diamond, a contact injecting holes. Such a contact may also be provided by the surface layer of the diamond drystal plate doped with aluminum or boron.

Graphite may serve as a material insuring, in conjunction with diamond, a contact injecting electrons. This contact may also be provided by the surface layer of the diamond crystal plate doped with phosphorus, lithium or carbon.

The material providing a blocking contact may be gold, silver or platinum. Such a contact may also be provided by the graphitized surface of the diamond crystal plate and by doping the surface layer of the plate with boron, aluminum, phosphorus, lithium and carbon. The formation of the blocking and injecting contacts is secured not only by using said materials, but also by applying to it a potential of appropriate polarity, as well as owing to the damage of the surface crystalline structure of the plate, such as in the case of graphitization or doping.

The detector may be manufactured by a method wherein, according to the invention, a plate is cut from a diamond crystal, the thickness of the plate being equal to the distance traveled by the charge carriers in the crystal. With a view to prolonging the lifetime of the carriers, said plate is annealed in vacuum at 1,000° to 1,300°C. Prior to forming the contacts, the annealed plate of diamond crystal is etched by heating in an oxygen-containing medium in order to reduce the rate of surface recombination of the charge carriers, if necessary.

For forming the blocking and injecting contacts, both sides of the crystal plate are covered with a paint of silver, gold or platinum, and the plate is heated to a temperature of 500° to 700°C. The plate is held at this temperature for 2 to 3 hours in order to burn the metal into the plate.

The blocking and injecting contacts can be formed by applying to both sides of the crystal plate a solution of gold, silver or platinum salts and by heating the plate to a temperature of 500° to 700°C for several minutes in order to restore the metal.

For forming a graphite contact for injecting both electrons and holes, one side of the diamond crystal plate is covered with a colloidal graphite suspension, and the plate is heated in vacuum to a temperature of 500° to 600°C for about 3 hours.

A blocking contact is obtained by evaporating a film of gold, silver or platinum over one side of the plate. In some cases, for forming a blocking contact, the diamond crystal plate is graphitized by heating it in a vacuum of 0.1 torr for about 30 min at a temperature of 1,000° to 1,300°C.

Figure 2:
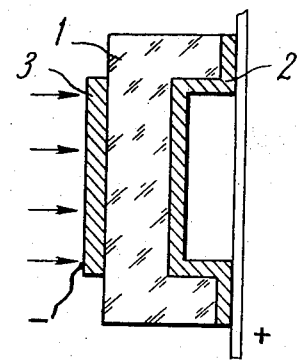

For a better understanding of the invention, there is presented hereinbelow a description of an exemplary embodiment thereof with reference to the accompanying drawings, wherein:

FIG. 1 is a diagrammatic elevation view which shows the detector in accordance with the invention; and FIG. 2 shows a modification in which the detector of the invention consist of a diamond crystal plate which a recess, provided with contacts.

The detector of the invention (FIG. 1) consists of a diamond crystal plate 1 on whose opposite sides contacts 2 and 3 are provided. Said plate 1 is made from a diamond in which the distance traveled by the electrons is longer than that traveled by the holes. Therefore, the contact 2 is made from silver which, in conjunction with diamond and under the influence of the positive potential applied to it, injects holes into the diamond crystal. The opposite contact 3 is made from gold and is blocking in relation to the charge carriers when a negative potential is applied to it.

Nuclear radiation entering the detector from the side of the blocking contact 3 causes ionization inside the diamond crystal. The resulting charge carriers, i.e. electrons and holes, move to the respective contacts under the influence of the applied field, the electrons moving to the contact 2, and the holes traveling to the contact 3. The thickness of the crystal plate 1 does not exceed the distance traveled by the charge carriers in the diamond crystal under the influence of the applied field. In the case of detectors operating with complete charge collection, high energy resolution and good counting efficiency, the following condition should be observed, $$d < \delta = \mu \pi$$

where $\mu$ is the mobility of the charge carriers, $\pi$ is the life of the charge carriers, E is the applied field strength, $\delta$ is the distance traveled by the charge carriers under the influence of the applied field, and $d$ is the thickness of the diamond crystal plate.

It is well known that in diamonds in which the nitrogen concentration determined by optical absorption at a wavelength of 7.8 $\mu$ is less than $10^{19}$ atoms cm$^{-3}$, the mobility of electrons is about 2,000 cm$^2$ V$^{-1}$sec$^{-1}$ at room temperature, while the mobility of holes is about 1,500 cm$^2$V$^{-1}$ sec$^{-1}$. In the purest diamond crystals, the lifetime of the charge carriers ranges from $10^{-9}$ to $10^{-8}$ sec. Experiments have shown that the mobility of electrons and holes in diamond at high electric fields decreases as the field is increased, at first proportional to $E^{-one-half}$, then proportional to $E^{-1}$ beginning with a field strength of $10^4$V cm$^{-1}$ for electrons at room temperature. Thus, the drift velocity $\mu$ E saturates at high fields and its limit for electrons is $10^7$ cm sec$^{-1}$ at room temperature. Consequently, at a lifetime of the charge carriers of $10^{-8}$ sec., the diamond crystal plate for the detector operating with complete charge collection has an optimum thickness of 0.2 to 0.3 mm. At the shorter lifetime of the charge carriers, the diamond crystal plate should be thinner and its thickness is estimated in accordance with the above equation.

During their movement to the contact 2, some electrons are trapped by traps always present in the crystal. As a result, the diamond crystal plate polarizes. The injecting contact 2 is designed to remove said polarization. Since deep traps are present in a diamond, the injection currents from the contact 2 are limited by a space charge accumulated by said traps. Thus, the injection currents do not induce significant conductivity and, consequently, noise. However, when field and charge equilibrium inside the crystal is disturbed due to polarization created by incident nuclear radiation, charge emission from the contact 2 restores the initial steady state of the crystal. Since the higher field strength within the ionization zone favors the reduction of losses in the electron-hole plasma when using the detector for counting the nuclear particles with low penetration, the blocking contact 3 should be located on the irradiated side of the plate 1.

The charge carriers, i.e. holes, which move to the blocking contact 3 under the influence of the applied field may also be trapped. In this case, however, the trapped holes are in the ionization zone and can be neutralized by the charge carriers of opposite sign, i.e. by the electrons.

Thus, the present detector operates with complete charge collection and does not polarize under prolonged irradiation due to the fact that the thickness of the diamond crystal plate does not exceed the distance traveled by the charge carriers and the appropriate contact system is provided.

In like manner, the detector can be manufactured from a diamond crystal in which the distance traveled by electrons is less than that traveled by holes. The difference is that the contact on the irradiated side is an blocking in relation to electrons and a positive potential is applied to it, while the opposite contact injects electrons and the negative potential is applied to it.

The detector shown in FIG. 2 is made from a diamond crystal plate whose thickness is considerably larger than the distance traveled by the charge carriers. A recess is therefore in the crystal plate, the thickness of the bottom of said recess not exceeding the distance traveled by the charge carriers. This detector operates in the same way as the detector described above, has greater mechanical strength owing to the thickened peripheral area and is more convenient with respect to handling.

The diamond detector described hereinabove is made from natural diamond with a nitrogen contact less than $10^{19}$ atoms cm$^{-3}$. The selection of crystals for making detectors is based on the estimation of the mean lifetime of the charge carriers throughout the crystal by measuring a photocurrent value at a wavelength of 250 m$\mu$. The photoconductivity at 250 m$\mu$ is imperfection photoconductivity and the optical absorption coefficent at 250 m$\mu$ has a value ranging from 5 to 15 cm$^{-1}$. Under these conditions one may consider, with an accuracy of 50 percent, that the light is completely absorbed in said crystals. Then, the mean lifetime of the charge carriers throughout the crystal can be estimated on a value of photocurrent, without measuring the absorption coefficient. Crystals with the mean lifetime longer than $10^{-9}$ sec are selected for making the detectors.

The selected crystals are cut into plates 0.1 to 0.3 mm thick. After cutting, the plates are placed in a $10^{-6}$ torr vacuum and annealed for 6 to 8 hours at a temperature ranging from 1,000° to 1,300°C. In some cases, the thermal treatment increases the lifetime of the charge carriers considerably.

In the annealed plates, the lifetime of the charge carriers is once more estimated by using the same technique, but at wavelengths of 225 and 220 m$\mu$. The edge absorption begins in diamonds at these wavelengths. The absorption coefficients are 20 and 1,000 cm$^{-1}$, respectively. The mean lifetime of the charge carriers throughout the crystal is estimated at a value of photocurrent at 225 m$\mu$, whereas the effect of surface recombination upon the value of photoconductivity is estimated at a wavelength of 220 mμ (the depth of light penetration is about 20 μ).

Plates with a mean lifetime throughout the crystal of the order of $10^{-8}$ sec and higher are selected for further treatment.

In some cases, surface recombination is significant. The reduction of the rate of surface recombination is obtained by oxygen etching the specimens in the atmosphere for several minutes at a temperature of 800° to 900°C. If the thickness of the diamond plate after cutting, annealing and etching is larger than necessary for the operation of the detector with complete charge collection, the plate is reduced to the desired thickness, for example, by polishing, grinding or etching.

After mechanical treatment, the crystal plate is subjected to thermal treatment as it, has been described hereinabove and to etching.

Then, contacts are applied to the prepared plate. The simplest method of obtaining a contact for injecting holes on one side of the plate consists of applying silver paint with subsequent burning of the paint into the plate in the atmosphere at about 600°C for 2 to 3 hours. A blocking contact is formed by evaporating a film of gold over the opposite side of the plate in vacuum at room temperature.

In like manner, an injecting contact can be formed on one side of the place by burning onto the plate gold or platinum from a paint. A contact for injecting holes is also formed by restoring platinum, silver or gold from a solution of their salts by heating the diamond crystal plate covered with said solution to a temperature in the range of from 500° to 700°C for several minutes.

For the formation of graphite contact for injecting both electrons and holes, a colloidal graphite suspension, such as Aquadag, is applied to one side of the diamond crystal plate and the plate is heated to a temperature ranging from 500° to 600°C in a vacuum for about 3 hours. Then, over the opposite side of the plate, a film of gold is evaporated for forming a blocking contact.

In some cases, a blocking contact is obtained by graphitizing the diamond crystal plate by heating the same in the temperature range of from 1,000° to 1,300°C in a vacuum of 0.1 torr for about 30 min. Then, the resulting graphite layer is removed from one side of the plate. A film of a colloidal graphite suspension is applied to this side. Then the plate is heated in a vacuum at a temperature ranging from 500° to 600°C for obtaining an injecting contact. In like manner, an injecting contact can be obtained after the removal of said layer by burning into the plate silver from a paint as described above. The present diamond detector for nuclear radiations has a number of advantages. It can detect nuclear particles with the range up to $2\times10^{-2}$ cm and operates at room and higher temperatures. In addition, it possesses a high energy resolving power of 7 percent at room temperature and a counting efficiency of 100 percent. The detector operates with complete charge collection and does not polarize under prolonged irradiation.

We claim:

1. A method of manufacturing a nuclear radiation detector, comprising forming a plate from a diamond crystal, the thickness of which plate does not exceed the distance traveled by charge carriers under the influence of an applied field, annealing said plate in a vacuum at a temperature of 1,000° to 1,300°C, and then forming blocking and injecting contacts on opposite sides of said plate so that during operation polarization within the plate can be removed by injection of charge carriers into said plate via the injecting contact, said injecting contact being formed on the side of the plate opposite to that to be subjected to the radiation to be detected, said injecting contact being formed of a material capable, in conjunction with the diamond crystal plate, of injecting the charge carriers under the influence of said field.

2. A method of manufacturing a detector according to claim 1, wherein, prior to forming the contacts, the annealed diamond crystal plate is etched by heating the same in an oxygen-containing medium for decreasing the rate of surface recombination of the charge carriers.

3. A method of manufacturing a detector according to claim 1, wherein both sides of the diamond crystal plate are covered with silver paint, then the plate is heated to a temperature of 500° to 700°C until silver contacts are formed on the sides of the plates.

4. A method of manufacturing a detector according to claim 1, wherein both sides of the diamond crystal plate are covered with gold paint, then the plate is heated to a temperature of 500° to 700°C until gold contacts are formed on both sides of the plate.

5. A method of manufacturing a detector according to claim 1, wherein both sides of the diamond crystal plate are covered with platinum paint, then the plate is heated to a temperature of 500° to 700°C until platinum contacts are formed on both sides of the plate.

6. A method of manufacturing a detector, according to claim 1, wherein both sides of the diamond crystal plate are covered with a solution of silver salts, then the plate is heated to a temperature of 500° to 700°C until silver is deposited for forming the contacts.

7. A method of manufacturing a detector according to claim 1, wherein both sides of the diamond crystal plate are covered with a solution of gold salts, then the plate is heated to a temperature of 500° to 700°C until gold is deposited for forming the contacts.

8. A method of manufacturing a detector, according to claim 1, wherein both sides of the diamond crystal plate are covered with a solution of platinum salts, then the plate is heated to a temperature of 500° to 700°C until platinum is deposited for forming the contacts.

9. A method of manufacturing a detector according to claim 1, wherein the blocking contact is first formed on one side of the diamond crystal plate, whereupon a colloidal graphite suspension is applied to the opposite sides and the plate is heated to a temperature of 500° to 600°C in vacuum for forming the injecting contact.

10. A method for manufacturing a detector according to claim 1, wherein the diamond crystal plate is graphitized for forming the blocking contact, whereupon a resulting graphite layer is removed from one side of the plate, a colloidal graphite suspension is applied to it and the plate is heated to a temperature of 500° to 600°C in vacuum for forming the injecting contact.

11. A method of manufacturing a detector according to claim 1, wherein the diamond crystal plate is graphitized for forming the blocking contact, whereupon a resulting graphite layer is removed from one side of the plate, silver paint is applied thereto, and the plate is heated to a temperature of 500° to 700°C in vacuum until a silver injecting contact is formed thereon.

* * * * *